United States Patent
Liu (10) Patent No.: US 7,057,697 B2
(45) Date of Patent: Jun. 6, 2006

(54) IN-PLANE SWITCHING LIQUID CRYSTAL DISPLAY HAVING NANOMETER SCALE ROUGHNESS

(75) Inventor: Hong-Da Liu, Jubei (TW)

(73) Assignee: M-Display Optronics Corp., Hsinchu (TW)

( * ) Notice: Subject to any disclaimer, the term of this patent is extended or adjusted under 35 U.S.C. 154(b) by 32 days.

(21) Appl. No.: 10/733,300

(22) Filed: Dec. 12, 2003

(65) Prior Publication Data

US 2005/0128403 A1    Jun. 16, 2005

(51) Int. Cl.
G02F 1/1343    (2006.01)

(52) U.S. Cl. .................... 349/141; 349/46; 349/113; 349/147

(58) Field of Classification Search ................ 349/141, 349/46, 147
See application file for complete search history.

(56) References Cited

U.S. PATENT DOCUMENTS

| 5,708,486 | A | * | 1/1998 | Miyawaki et al. | ............ 349/44 |
| 5,745,207 | A | * | 4/1998 | Asada et al. | ................. 349/141 |
| 5,949,506 | A | * | 9/1999 | Jones et al. | ................. 349/112 |
| 6,177,970 | B1 | * | 1/2001 | Kim | ............................ 349/43 |
| 2003/0128317 | A1 | * | 7/2003 | Ohmuro et al. | ............. 349/113 |

* cited by examiner

*Primary Examiner*—Andrew Schechter
(74) *Attorney, Agent, or Firm*—Rosenberg, Klein & Lee (57) ABSTRACT

A pixel and its process for an in-plane switching liquid crystal display achieves more spreading angles and smooth performance for scattering of light for image display therewith by using a reflector having a reflective surface with roughness in nanometer scale for light scattering and contrast improvement. As a result, the reflectivity doesn't change enormously with the viewing angle and excellent anti-glare effect is obtained. Moreover, the roughness of the reflective surface is formed by the crystallization and the characteristic of the material thereof owns, and thus no additional mask is required.

7 Claims, 15 Drawing Sheets

IN-PLANE SWITCHING LIQUID CRYSTAL DISPLAY HAVING NANOMETER SCALE ROUGHNESS

FIELD OF THE INVENTION

The present invention relates generally to an in-plane switching (IPS) liquid crystal display (LCD), and more particularly, to a pixel and its process for an IPS LCD using a reflector having a nanometer scale roughness surface.

BACKGROUND OF THE INVENTION

Typically, twisted nematic (TN) mode or super twisted nematic (STN) mode is employed in LCDs. Unfortunately, TN mode and STN mode LCDs are disadvantageous for their narrow viewing angles. IPS LCD is therefore proposed for wider viewing angle. In addition to the wider viewing angle, an IPS LCD has the advantages of no compensator and fast response, and furthermore, there is one mask less than the TN mode LCD for its manufacture. However, the pixel electrode and the counter electrode of an IPS LCD are made of opaque metal and thus have smooth surfaces, resulting in mirror reflection and lower contrast. Even a rough surface made of organic material such as resin can be formed underlying the pixel electrode and the counter electrode to improve this weakness, introduction of additional organic material requires more masks in the manufacture process and thus increases process complexity and cost. Furthermore, the thermal durability of the organic material is not good for it is up to only about 250° C. On the other hand, the large difference between the higher and the lower levels of the rough surface as of 0.5–1.5 um forces the LCD to have its cell gaps being enormously varied, resulting in the reflection efficiency lowered from ideally 100% to 60–85%.

Therefore, it is desired an IPS LCD with improved rough surface for the reflector thereof and decreased number of mask in its manufacture process.

SUMMARY OF THE INVENTION

An object of the present invention is to propose a pixel and its manufacture process for an IPS LCD with a reflector having a reflective surface with roughness in a nanometer scale.

Another object of the present invention is to propose a pixel and its manufacture process for an IPS LCD with decreased number of mask for the reflector formation.

In a pixel of an IPS LCD, according to the present invention, there are included a first structure on a substrate with a reflective surface having a nanometer scale roughness for light scattering and contrast enhancement, a second structure for switch device formation over a first part of the first structure, an LC layer over the second structure and a second part of the first structure, and a third structure above the LC layer, of which the second part of the first structure includes a reflector having the nanometer scale roughness surface, and the third structure is an optical stack. In addition, positive or negative LC may be used for the LC layer. The proposed rough surface is formed from the crystallization and the characteristic of an insulator, and due to the first part and the reflector in the second part of the first structure manufactured at a same step, only four masks are required for manufacture of an LCD, which is half of the eight or nine mask process used for a conventional scattering transreflective LCD and thereby decreasing the cost enormously. Furthermore, since the roughness of the reflective surface of the reflector is in a nanometer scale, it is achieved wider spreading angles and smooth performance for the light scattering therewith, which means the reflectivity does not vary enormously with the viewing angle and an excellent anti-glare effect is obtained additionally. On the other hand, due to the reduced difference of the height on the reflective surface of nanometer scale roughness even smaller than that of the conventional interlayer diffusion reflector (IDR), the variation between the cell gaps is lowered, and the reflection efficiency is kept at the best condition. The reflector is formed by inorganic film process and thus it endures higher temperature than that of a usual organic material.

Alternatively, an embodied bottom plate comprises a substrate, a thin film transistor (TFT) on the substrate, a plurality of reflectors, a passivation covered over the reflectors, and a metal on the passivation and connected to one of the reflectors through the passivation. Each of the reflectors includes a micro scattering layer having a nanometer scale roughness surface, and a reflective layer on the micro scattering layer and conformal to the nanometer scale roughness surface, and the reflective layer is formed with the same metal layer as that of the gate electrode of the TFT. The micro scattering layer includes a conductor of ITO and an insulator thereon. The nanometer scale roughness surface is formed from the material property of the insulator, and the reflective layer is formed of metal with high reflectivity. Since the gate of the TFT and the reflective layer in the alternative embodiments are not formed at the same step, one more mask is required additionally.

BRIEF DESCRIPTION OF THE DRAWINGS

The above and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
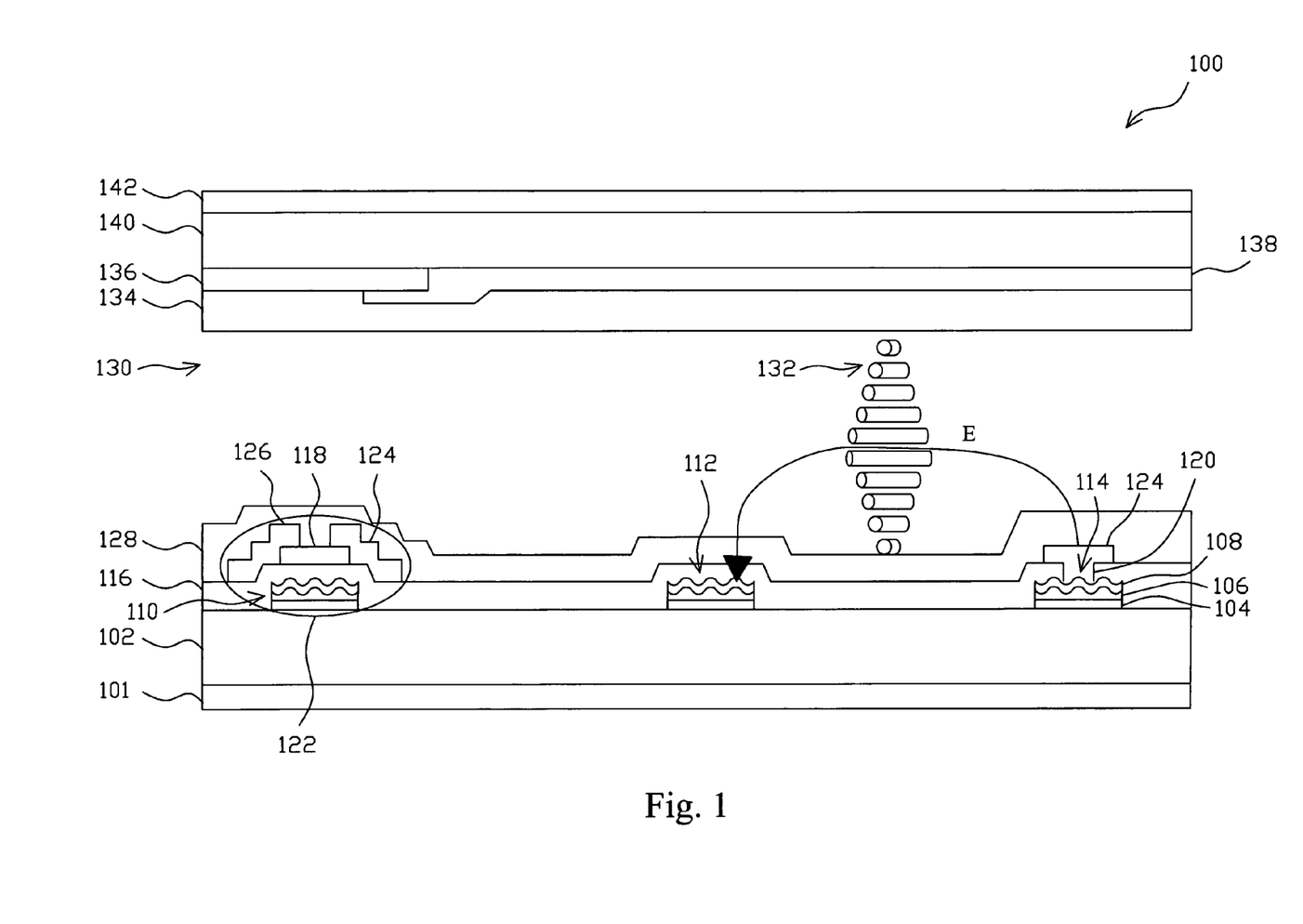
FIG. 1 shows an embodiment pixel for an IPS LCD of the present invention.

FIG. 1 shows the first embodiment of the present invention by a pixel structure 100 of an IPS LCD that is a transreflective LCD, which comprises a first structure on a substrate 102, having a nanometer scale roughness surface thereof and including a first part with a gate electrode 110 and a second part with reflectors 112 and 114, a passivation 116 covered over the first structure, a second structure on the passivation 116 lying upon the gate electrode 110. The second structure includes a drain electrode 124, a source electrode 126 and a channel formed in an amorphous silicon semiconductor layer 118 between the drain electrode 124 and the source electrode 126. The gate electrode 110 and the second structure form a switch device, i.e., a TFT 122, and the drain electrode 124 is connected to the reflector 114 through a contact hole 120 in the passivation 116. When voltages are applied to the TFT 122, corresponding transverse electric field E is built up between the reflectors 112 and 114 to twist LC 132 above the second part. Another passivation 128 is covered over the second structure, a bottom polarizer is arranged behind the substrate 102, LC 130 is arranged between the passivation 128 and a third structure. In this embodiment, the LC 130 and 132 are selected of negative type, even though either positive type or negative type LC are available for the present invention, preferably with birefringence $\Delta n$ ranged between 0.05–0.14 and phase retardation $\Delta n \times d$ of 50–410 nm. Moreover, the TFT 122 is NMOS.

The third structure includes a color filter 138, a scattering film between the color filter 138 and the LC 130, a black matrix 136 made of black resin instead of Cr metal arranged in front of the color filter 138, a compensator 140 on the color filter 138, a top polarizer 142 on the compensator 140. The structure of the gate electrode 110 and the reflectors 112 and 114 includes a conductor 104 such as ITO and IZO, an insulator 106 such as silicon nitride ($SiN_x$) over the conductor 104, and a reflective layer 108 made of high reflective metal such as aluminum, silver and aluminum alloy over the insulator 106. When the insulator 106 is formed on the conductor layer 104, due to crystallization and the characteristic of the material, the surface of the insulator 106 becomes of roughness in nanometer scale. Thus, there's no need to apply resin thereon to form a rough surface as in conventional process. Furthermore, since the reflectors 112 and 114 are manufactured at the same step for the gate electrode 110, the pixel structure 100 of an LCD can be manufactured by four mask process, which is only half of the 8 or 9 mask process used for conventional scattering transreflective LCDs and thus reduces the cost enormously.

The rough surfaces of the reflectors 112 and 114 have smaller waviness difference and waviness period, so there's wider scattering angle and smooth effect, which means that the reflectivity does not vary with the viewing angle enormously and excellent anti-glare effect is obtained. As a result, the reflection efficiency can be kept at the best condition. In addition, since inorganic film process is used, the inventive reflector can endure higher temperature than conventional organic reflector.

Figure 2:
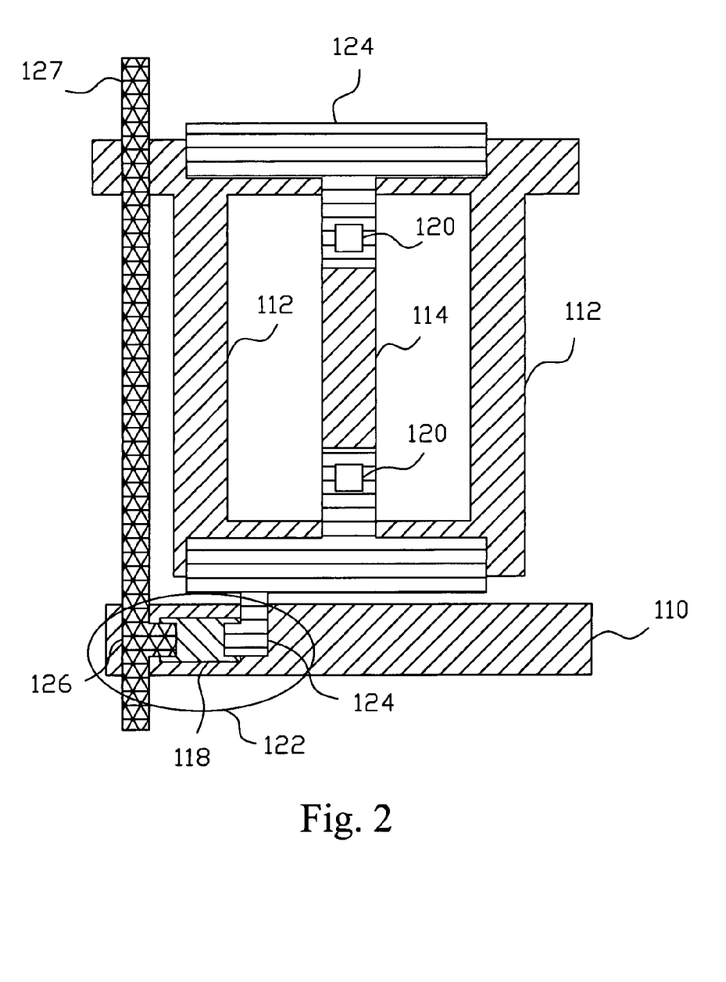
FIG. 2 is the top view of the pixel shown in FIG. 1.

FIG. 2 is the top view of the LCD pixel structure 100 shown in FIG. 1, in which the source electrode 126 is connected to bus 127.

Figure 3:
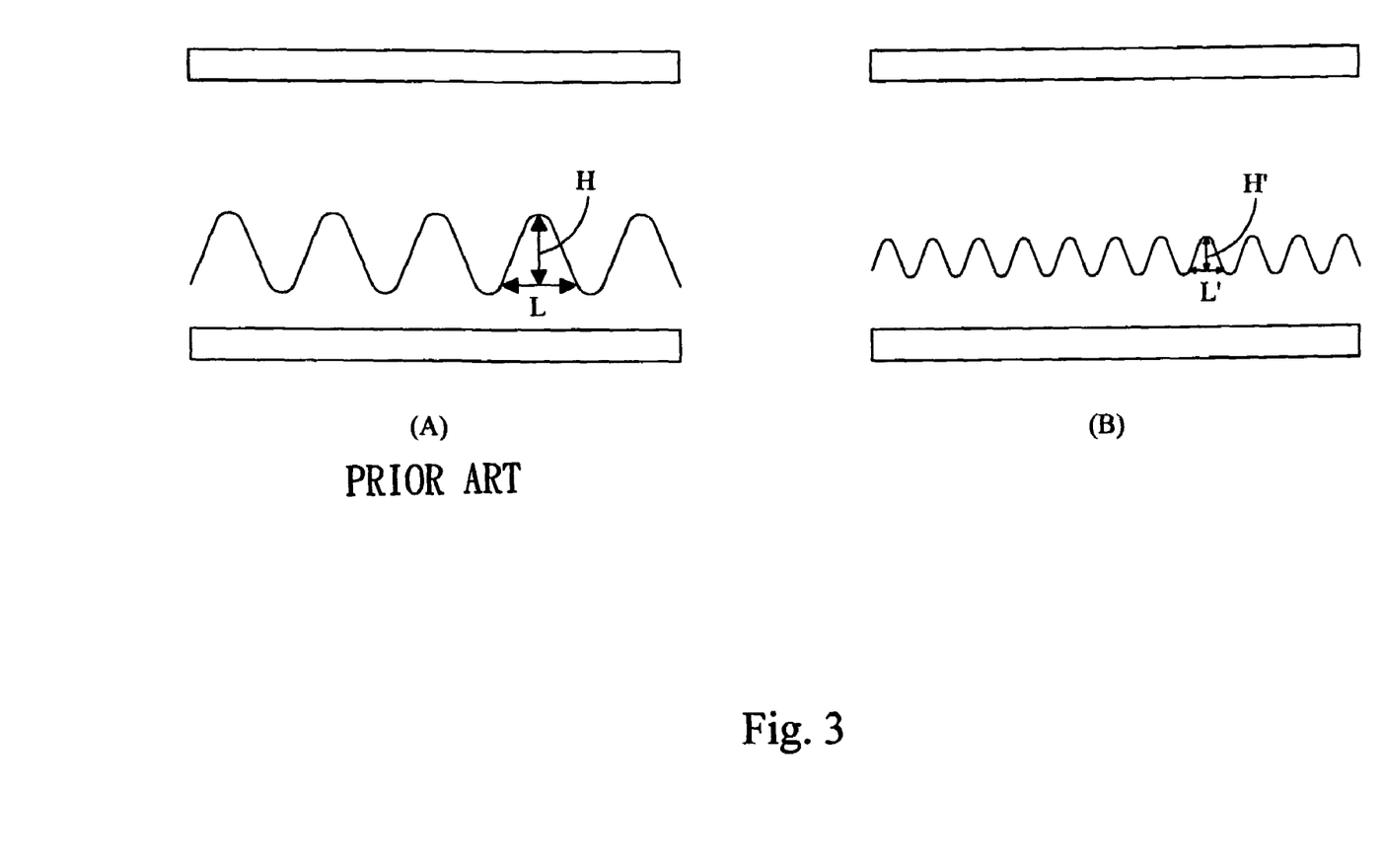
FIG. 3A shows the rough surface of a conventional reflector.
FIG. 3B shows the rough surface of the reflector of the present invention.

FIG. 3 is for comparison between the rough surfaces of the reflector of the present invention and the conventional reflector. In FIG. 3A, the rough surface of a conventional reflector has waviness difference H of 0.5–1.5 um and waviness period L of 5–20 um. In contrast, the rough surface of the reflector of the present invention shown in FIG. 3B has the difference in height H' of 5–50 nm and the waviness period L' of under 20 nm. Since the difference in height of the rough surface of the ultra micro reflector (UMR) is smaller, the gap variation of the LC is reduced, thereby keeping the reflection efficiency at the best condition, and making the scattering angle wider and more uniform simultaneously.

Figure 4:
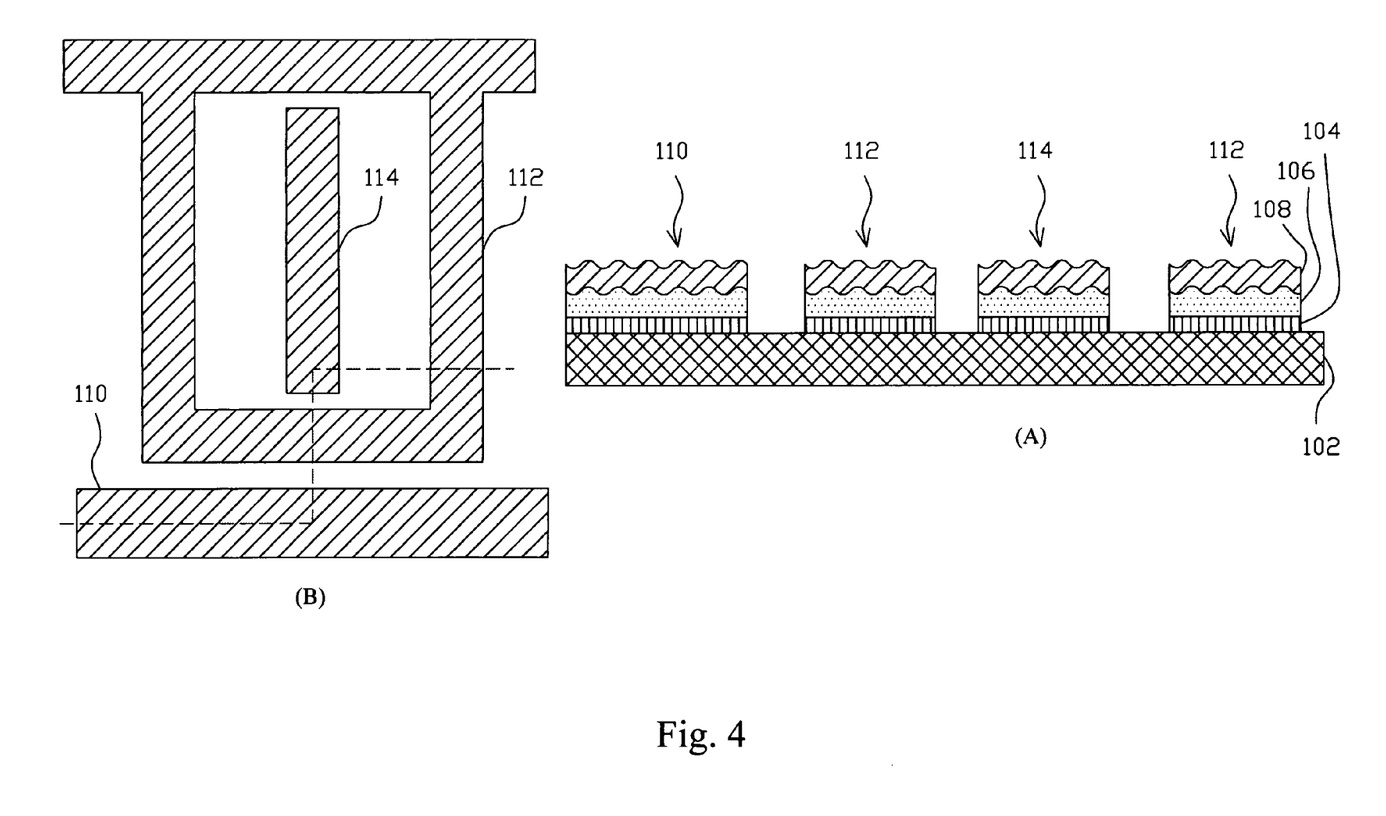
FIGS. 4–8 show a process for the structure formation of the IPS TFT shown in FIG. 1.

FIGS. 4–8 show the top views and cross-sectional views of the LCD pixel structure 100 during its manufacture process. As shown in FIG. 4, a conductor 104 made of ITO is first deposited on the substrate 102, and an insulator 106 composed of $SiN_x$ is then deposited on the conductor 104. When the insulator 106 is formed on the conductor 104, a nanometer scale roughness is formed on the surface of the insulator 106 due to the crystallization and the characteristic of the material itself, as shown in FIG. 3B. In follow, a metal with high reflectivity, such as aluminum, silver and aluminum alloy, is deposited on the insulator 106 to form the reflective layer 108. The reflective layer 108 is conformal to the rough surface of the insulator 104 so as to have the roughness in nanometer scale. Then, the reflective layer 108, the insulator 106 and the conductor 104 are etched to form the electrodes 110, 112 and 114 that have the roughness in nanometer scale on their surfaces.

Figure 5:
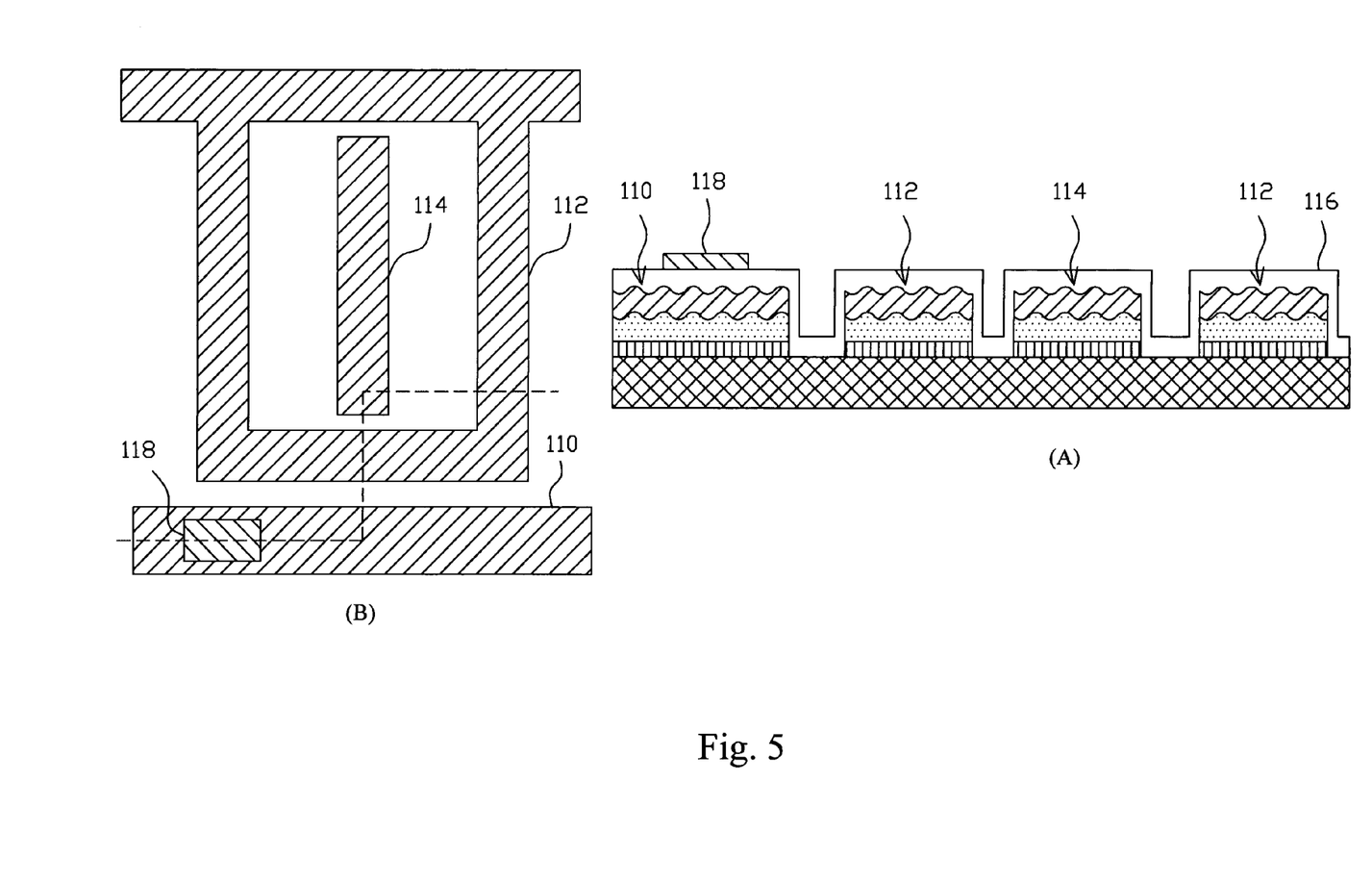
Figure 6:
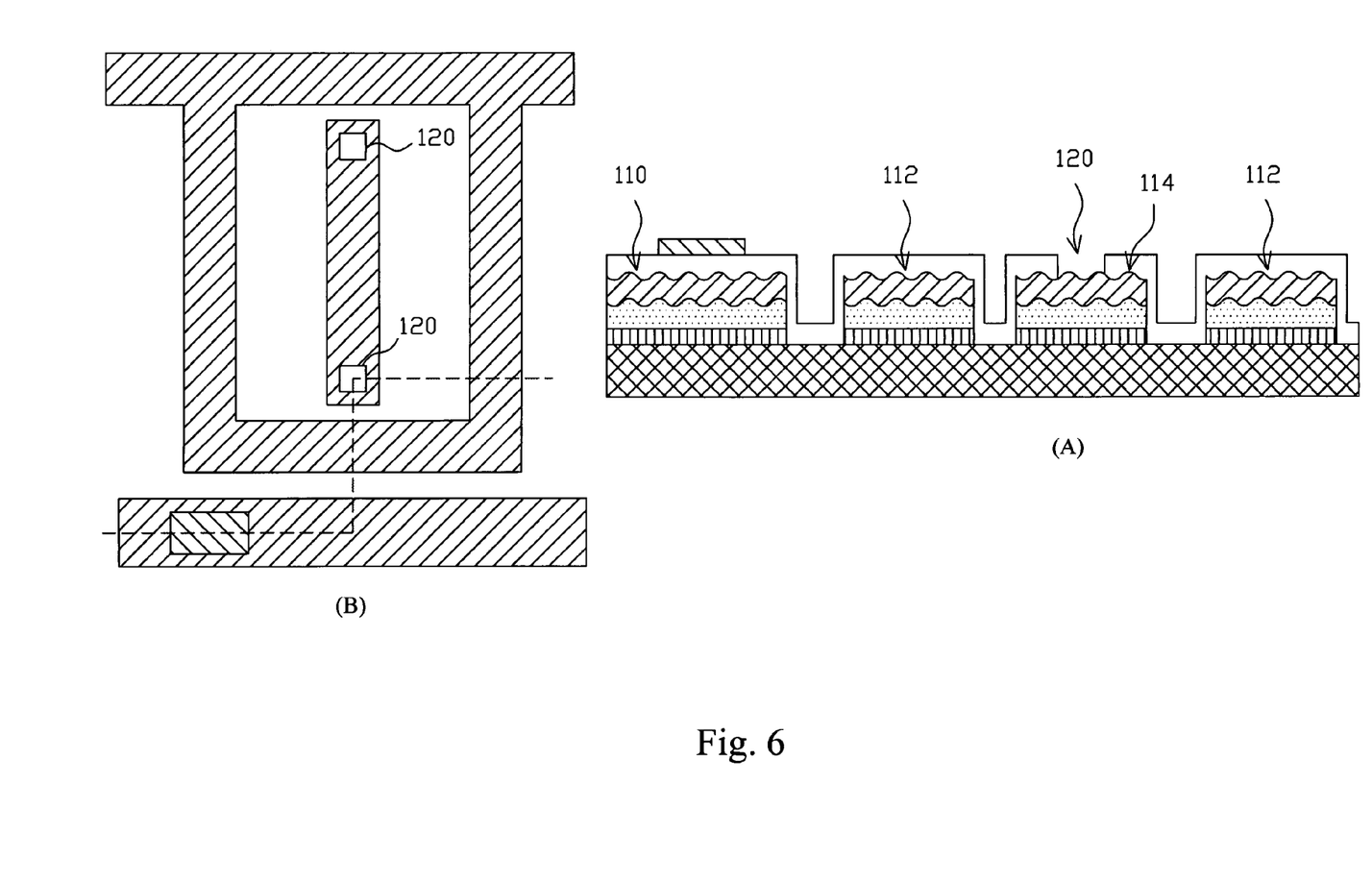

Referring to FIG. 5, a passivation 116 is formed to cover on the electrodes 110, 112 and 114, and an amorphous semiconductor layer 118 is formed on the top surface of the electrode 110. Then, as shown in FIG. 6, the passivation 116 on the electrode 114 is etched until the electrode 114 is exposed so as to form a contact hole 120.

Figure 7:
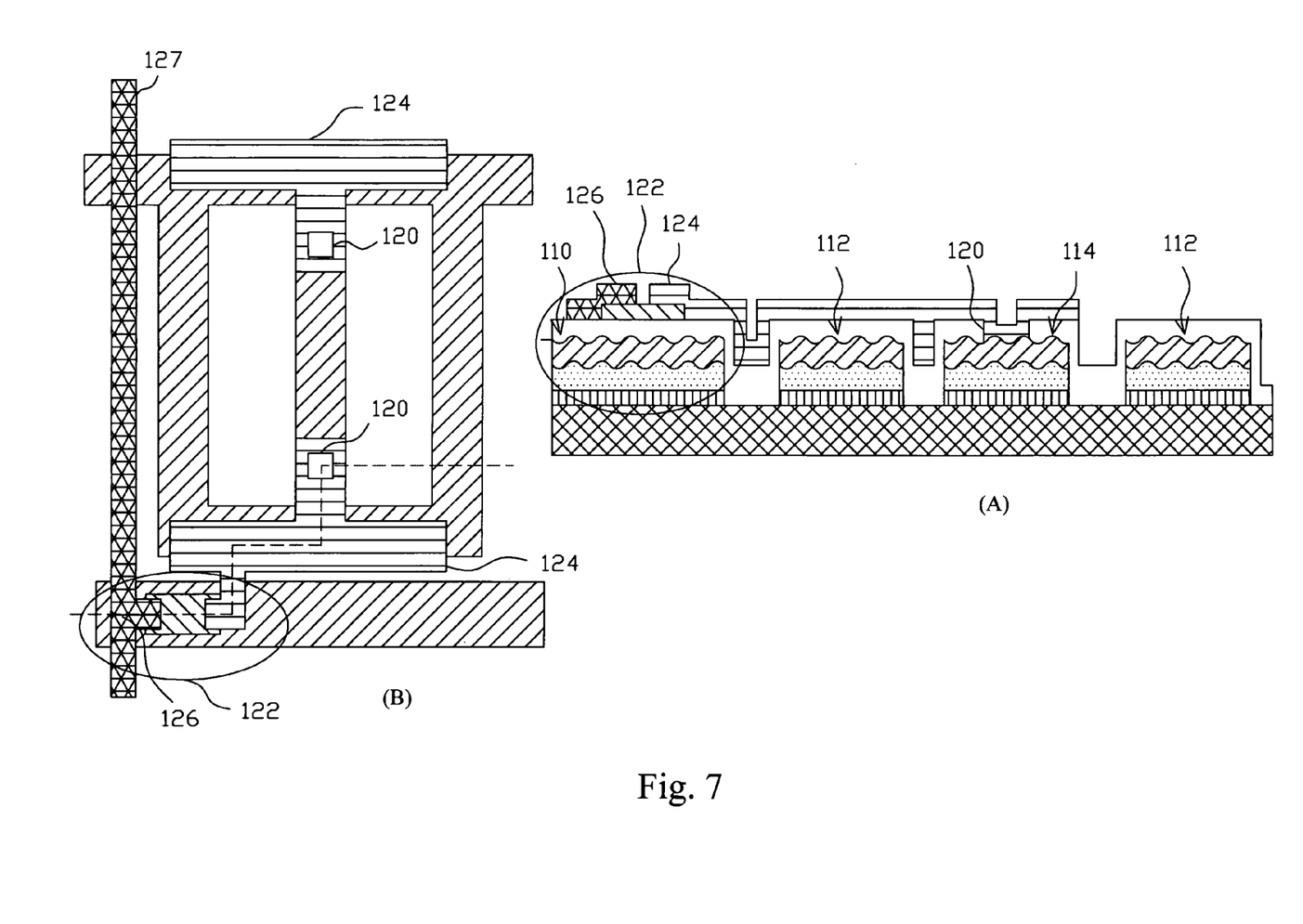
Figure 8:
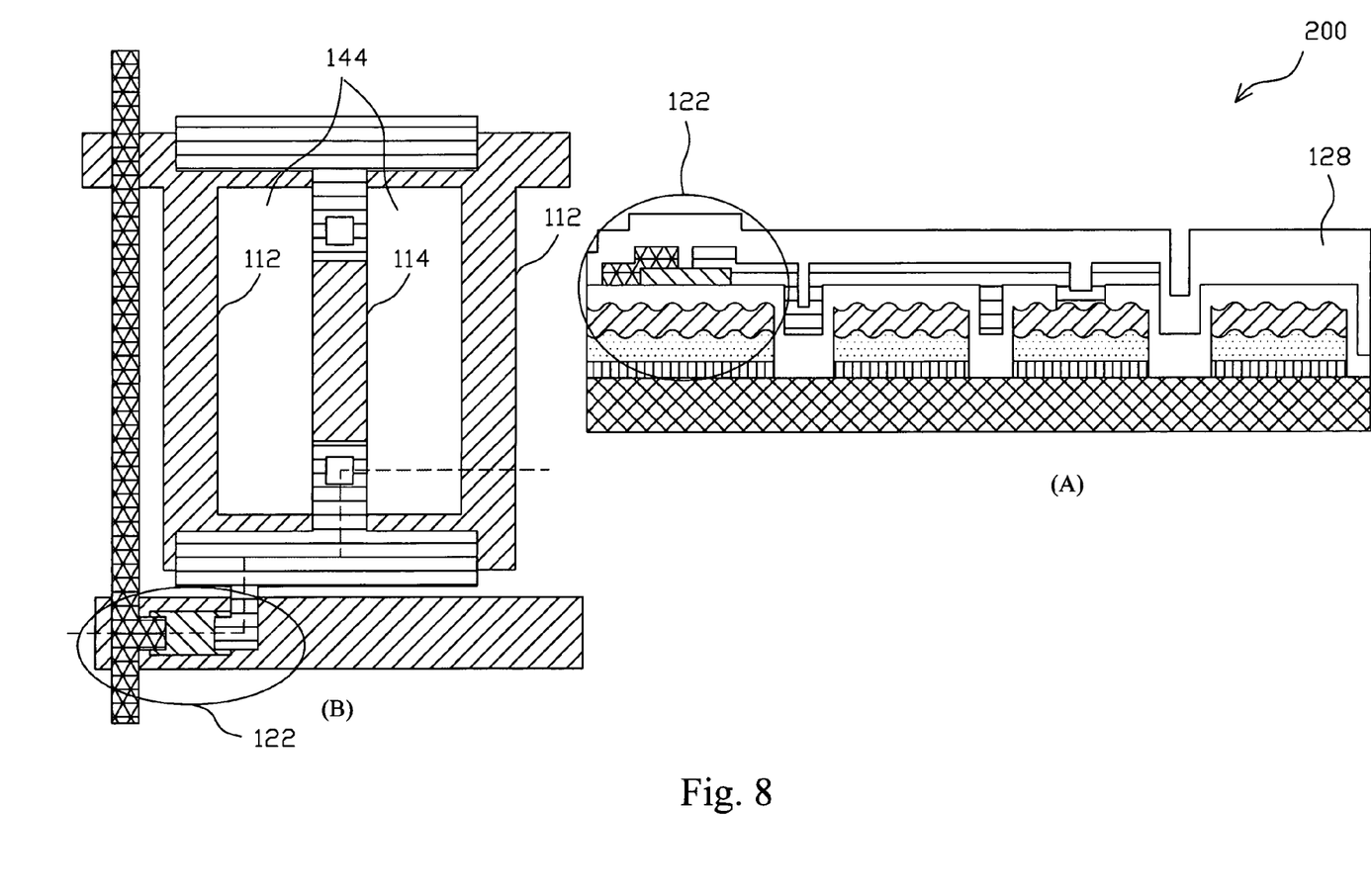
Figure 9:
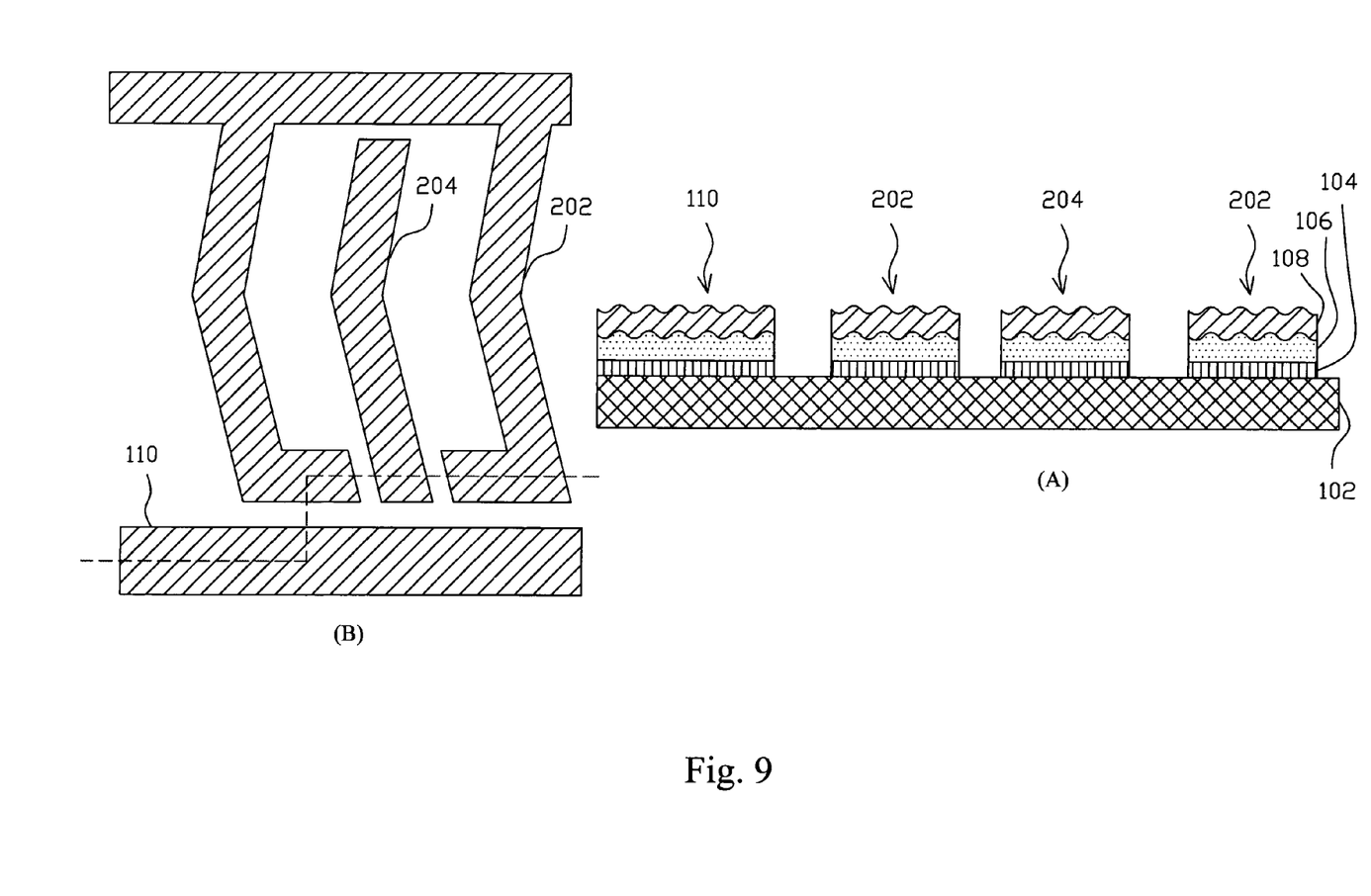
FIGS. 9–13 show a process for the structure formation of another IPS TFT.
Figure 10:
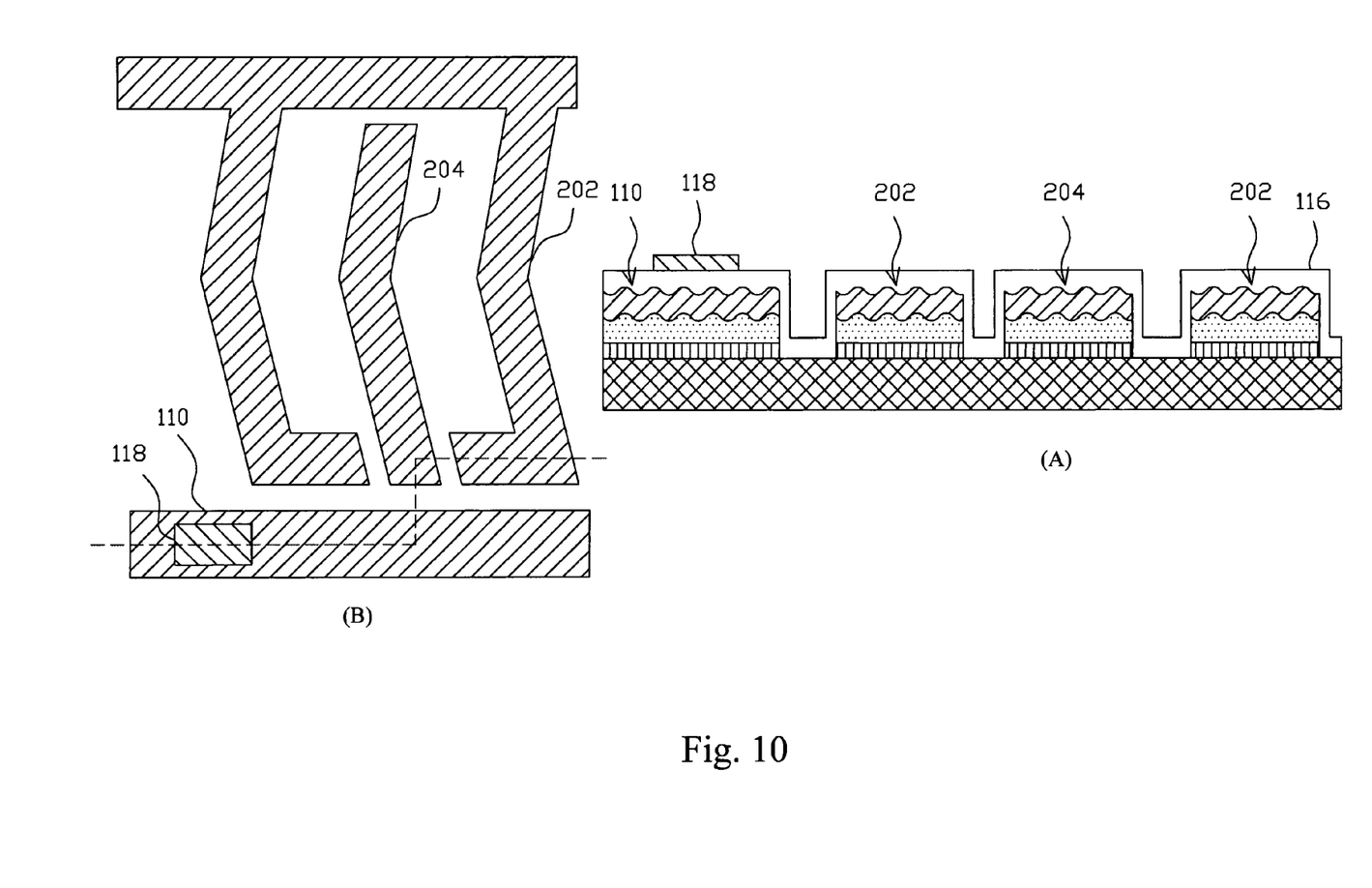
Figure 11:
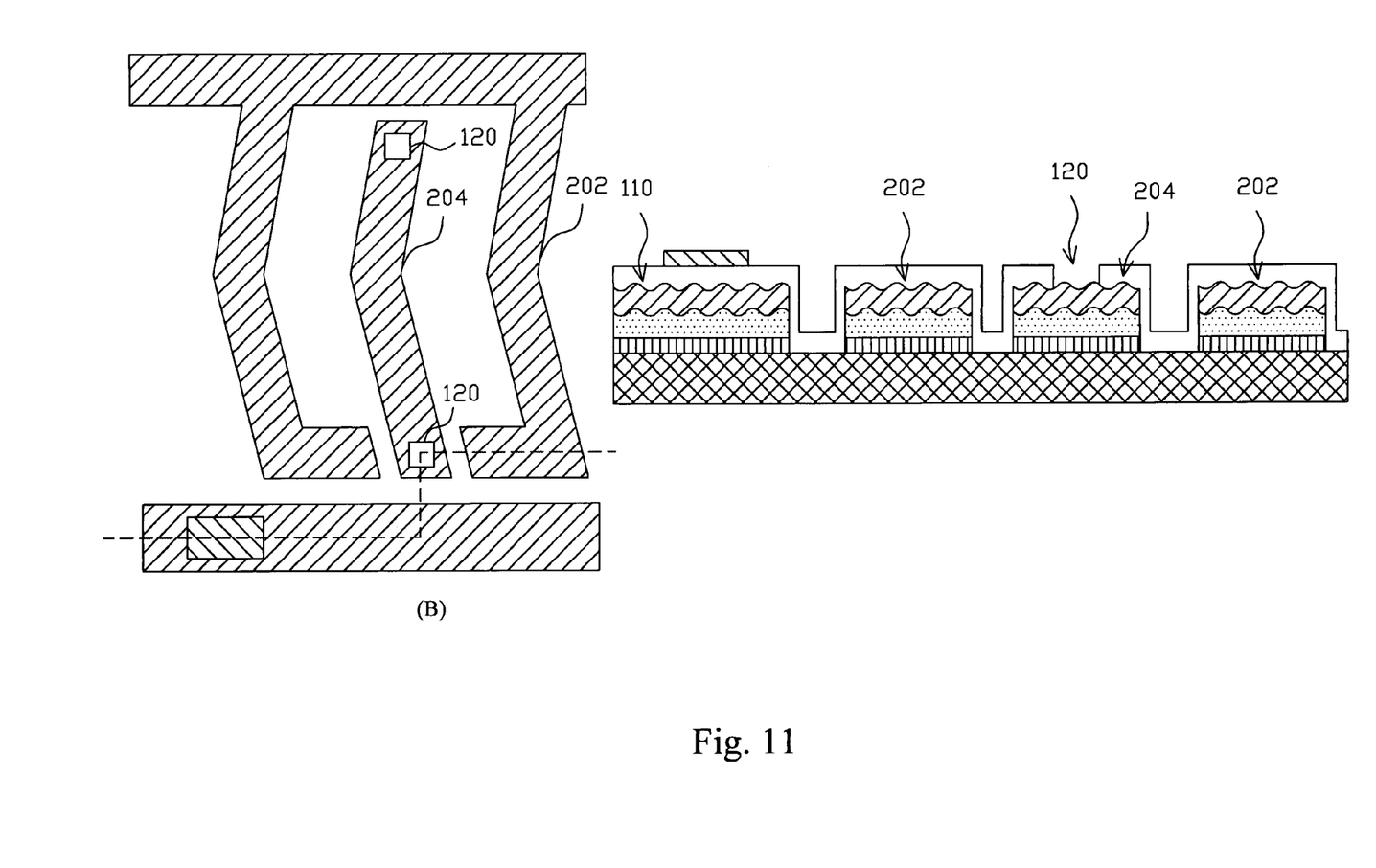
Figure 12:
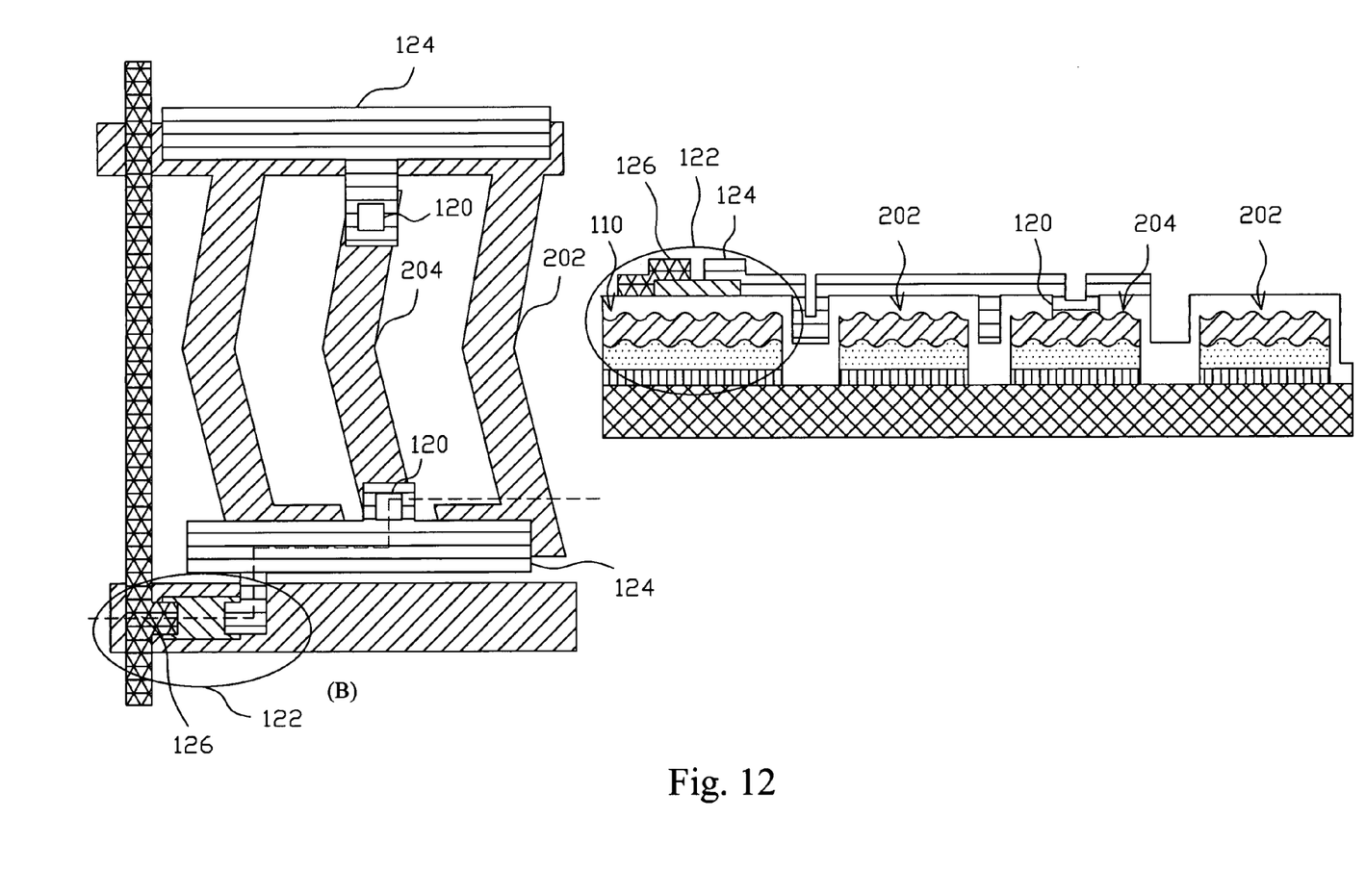
Figure 13:
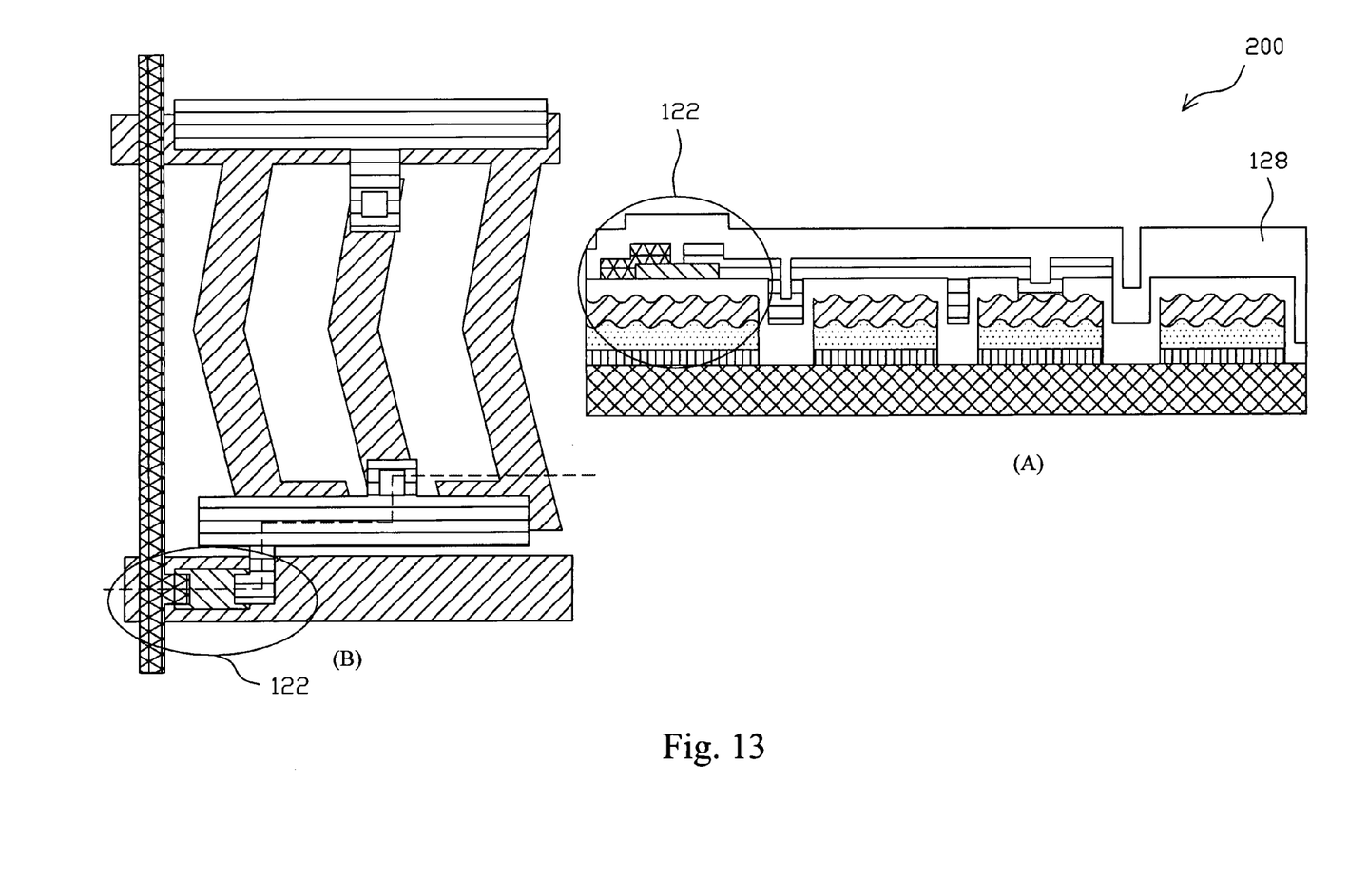

Furthermore, a second metal is deposited on the passivation 116, followed by selective etch to form the TFT 122, as shown in FIG. 7. The gate electrode of the TFT 122 is the electrode 110, and the second metal after selectively etched becomes the drain electrode 124 and the source electrode 126. The drain electrode 124 is connected to the reflector 114 through the contact hole 120, and the source electrode 126 is connected to the bus 127. Finally, a second passivation 128 is deposited to cover on the TFT 122, as shown in FIG. 8. In FIG. 8, the area ratio of the transparent region 144 to the reflective region formed by the reflector 112 and 114 is in the range of 10–400%.

FIGS. 9–13 show a manufacture process for another IPS TFT structure 200, which is similar to that shown in FIGS. 4–8, only that the reflectors 202 and 204 within the TFT structure 200 are bent.

Figure 14:
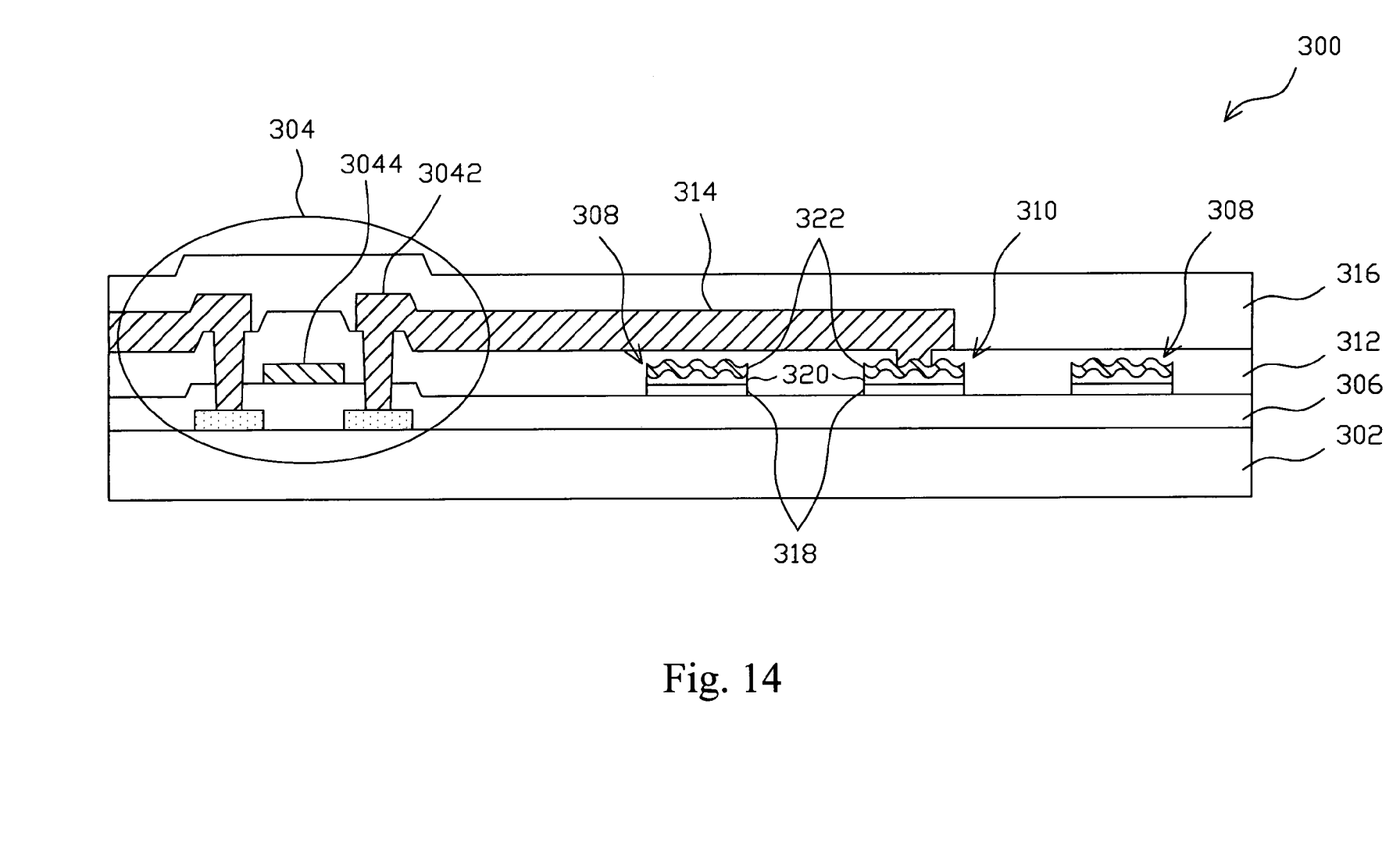
FIG. 14 shows another embodiment for the bottom plate for the pixel shown in FIG. 1.

FIG. 14 shows another embodiment for the bottom plate for the pixel shown in FIG. 1. A bottom plate 300 comprises a substrate 302, a TFT 304 on the substrate 302, an insulator 306 on the substrate 302, reflectors 308 and 310 on the insulator 306, a passivation 312 covered on the reflectors 308 and 310, a metal 314 on the passivation 312 and connected to the reflector 310 through the passivation 312, and another passivation 316 covered on the metal 314. The TFT 304 herewith is PMOS, and the metal 314 and the drain electrode 3042 of the TFT 304 are made of the same layer of metal. The reflectors 308 and 310 both include a micro scattering layer formed with an ITO 318 and an insulator 320 that has a rough surface with roughness in nanometer scale, and a reflective layer 322 on the insulator 320 conformal to the rough surface of the insulator 320 to have the nanometer roughness. The reflective layer 322 and the gate 3044 of the TFT 304 are made of the same layer of metal. In addition to the material in the foregoing description, the insulator 320 may be made of amorphous silicon or polysilicon. Alternatively, the micro scattering layer may be formed by a layer of crystalline seeds and an insulator formed by high temperature sintering crystallization. In this embodiment, the gate electrode 3044 of the transistor 304 and the reflectors 308 and 310 are not made at a same step, and thus one more mask than the first embodiment is needed.

Figure 15:
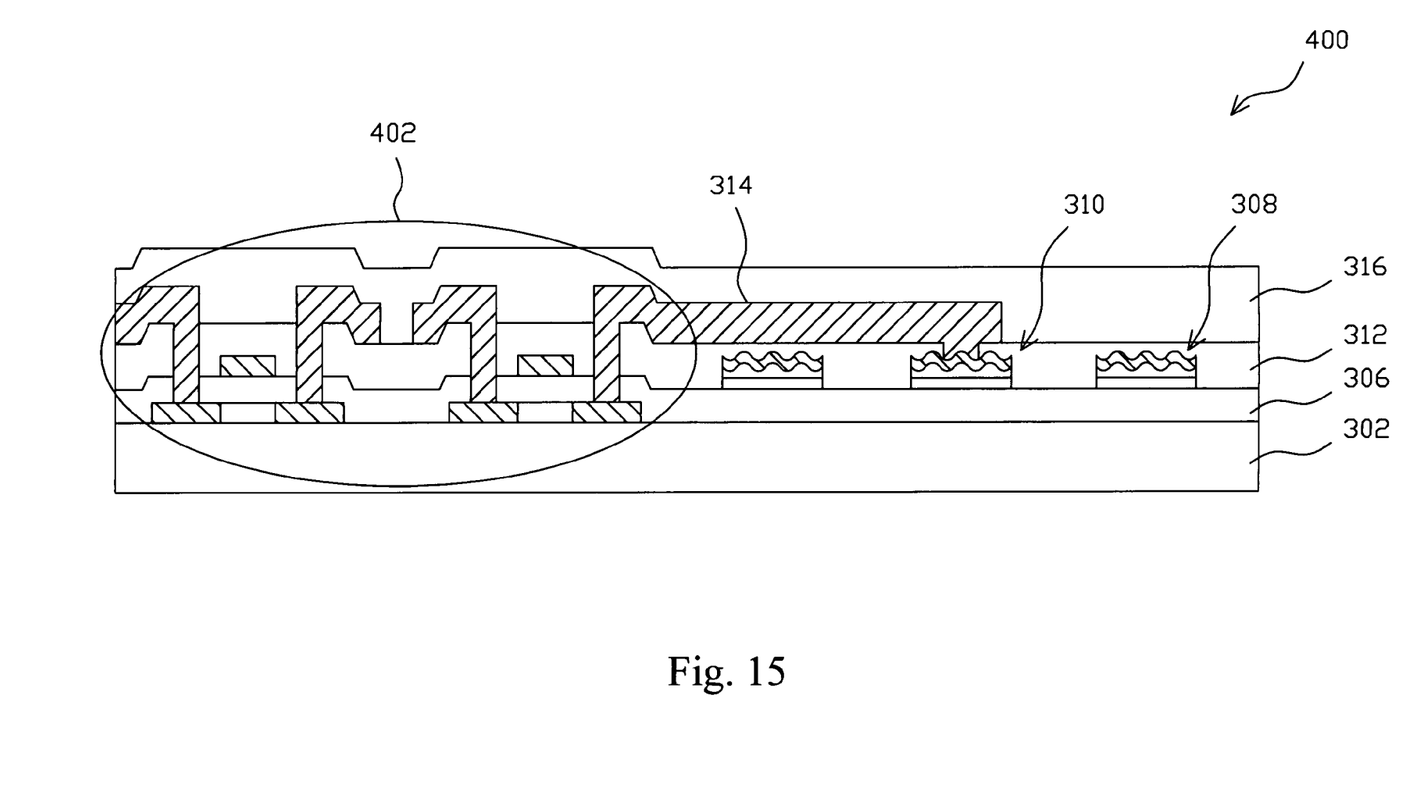
FIG. 15 shows a further embodiment for the bottom plate for the pixel shown in FIG. 1.

FIG. 15 shows a further embodiment for the bottom plate for the pixel shown in FIG. 1. Similar to the bottom plate 300, the structure of bottom plate 400 also comprises a substrate 302, a TFT 402, an insulator 306, reflectors 308 and 310, a passivation 312, a metal 314, and another passivation 316. However, the TFT 402 is a CMOS.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A pixel for an in-plane switching liquid crystal display, comprising:
    a first structure on a substrate having a reflective surface with a nanometer scale roughness defined by a height in the range of 5–50 nm and a width less than 20 nm for enhancing a light scattering angle and contrast enhancement, the first structure including (a) a micro scattering layer on the substrate with the nanometer scale roughness, the micro scattering layer being formed by a conductor on the substrate and an insulator on the conductor with the nanometer scale roughness and (b) a reflective layer made of high reflective metal on the micro scattering layer and conformal to the micro scattering layer to thereby form the reflective surface;
    a second structure on a first part of the first structure having a switch device thereof;
    a liquid crystal layer above the second structure and a second part of the first structure; and
    a third structure on the liquid crystal layer.

2. The pixel of claim 1, wherein the second part comprises a plurality of reflectors having the reflective surface with the nanometer scale roughness.

3. The pixel of claim 2, wherein the plurality of reflectors are bent.

4. The pixel of claim 1, wherein the third structure comprises:
    a color filter;
    a scattering film between the color filter and the liquid crystal layer; and
    a polarizer above the color filter.

5. The pixel of claim 1, wherein the first structure further comprises a transparent region having a first area, and the second part comprises a second area of the reflective surface, with an area ratio of the first area to the second area ranged between 10% and 400%.

6. A bottom plate for a pixel of an in-plane switching liquid crystal display, comprising:
    a substrate;
    a thin film transistor on the substrate;
    a plurality of reflectors each including:
        a micro scattering layer having a top surface with a nanometer scale roughness defined by a height in the range of 5–50 nm and a width less than 20 nm, the micro scattering layer including a conductor and an insulator on the conductor, the insulator having a top surface with the nanometer scale roughness; and
        a reflective layer on the micro scattering layer and conformal to the top surface to thereby form a reflective surface, wherein the reflective layer is made of a same metal of forming a gate of the thin film transistor;
    a passivation covered on the plurality of reflectors; and
    a conductor on the passivation and passing therethrough for connected to one of the plurality of reflectors.

7. The bottom plate of claim 6, further comprising a transparent region having a first area, and the plurality of reflectors having the top surface of a second area in total, with an area ratio of the first area to the second area ranged between 10% and 400%.

* * * * *